(12) United States Patent
Carra

(10) Patent No.: US 8,945,658 B2
(45) Date of Patent: Feb. 3, 2015

(54) APPLE WITH EDIBLE FILLING

(71) Applicant: Nancy Lynn Carra, Rockdale, IL (US)

(72) Inventor: Nancy Lynn Carra, Rockdale, IL (US)

( * ) Notice: Subject to any disclaimer, the term of this patent is extended or adjusted under 35 U.S.C. 154(b) by 3 days.

(21) Appl. No.: 13/859,419

(22) Filed: Apr. 9, 2013

(65) Prior Publication Data

US 2013/0309368 A1    Nov. 21, 2013

Related U.S. Application Data

(60) Provisional application No. 61/621,751, filed on Apr. 9, 2012.

(51) Int. Cl.
*A23L 1/212*   (2006.01)

(52) U.S. Cl.
CPC .................................. *A23L 1/2125* (2013.01)
USPC ............ 426/615; 426/478; 426/481; 426/485

(58) Field of Classification Search
CPC .......... A23L 1/007; A23L 1/2125; A23P 1/08
USPC .................................. 426/615, 478, 481, 485
See application file for complete search history.

(56) References Cited

U.S. PATENT DOCUMENTS

2011/0129574 A1*   6/2011   Pathak et al. ................... 426/93

* cited by examiner

*Primary Examiner* — Helen F Heggestad
(74) *Attorney, Agent, or Firm* — Wood, Phillips, Katz, Clark & Mortimer

(57) ABSTRACT

The combination of: a) an apple with a top and bottom and having fibrous/woody carpels and seeds removed to produce a cavity extending from the bottom of the apple upwardly but not fully to the top of the apple so as to leave the top stem intact; and b) an edible filling added to the apple within the cavity.

2 Claims, 2 Drawing Sheets

APPLE WITH EDIBLE FILLING

BACKGROUND OF THE INVENTION

1. Field of the Invention

This invention relates to apples and, more particularly, to an apple with an edible filling.

2. Background Art

Apples are commonly covered with caramel, and the like, to enhance their flavor. "Caramel apples" are offered as a regular product in grocery stores and are even more popular during holiday seasons.

Typically, the apple will be dipped in melted caramel, which is thereafter solidified. Before the caramel becomes too hard, it is common to embed nuts therein. The coated apple is typically placed on a discrete piece of paper for display. To facilitate handling, a stick is directed vertically into the core. The apple can be held by the projecting portion of the stick so that the person eating the product does not have to directly engage the caramel coating.

The traditional caramel apple has a number of associated problems. First of all, the exposed caramel coating, even after solidification, remains somewhat tacky. After touching the coating, the person consuming the product must generally wash his/her hands to rid themselves of the caramel residue.

As with any apple, the person consuming the product must chew around the core, preferably without taking in the fibrous/woody carpels and seeds. Aside from the fact that most persons do not wish to eat the core components, they may nonetheless become wedged between teeth during the process of trying to separate all of the more edible, non-core portion of the apple.

Further, the treatment of the apple with another edible substance is generally limited to one that will adhere to the apple as through a melting process.

SUMMARY OF THE INVENTION

The invention is directed to the combination of: a) an apple with a top and bottom and having fibrous/woody carpels and seeds removed to produce a cavity extending from the bottom of the apple upwardly but not fully to the top of the apple so as to leave the top stem intact; and b) an edible filling added to the apple within the cavity.

DETAILED DESCRIPTION OF THE PREFERRED EMBODIMENT

According to the invention, an apple A has the majority of its core removed in a strategic manner so as to produce a cavity C for reception of edible materials such as granola, caramel and nuts, other fruits, trail mix, etc. Virtually any consumable product can be placed in the cavity as a filling F.

Figure 1:
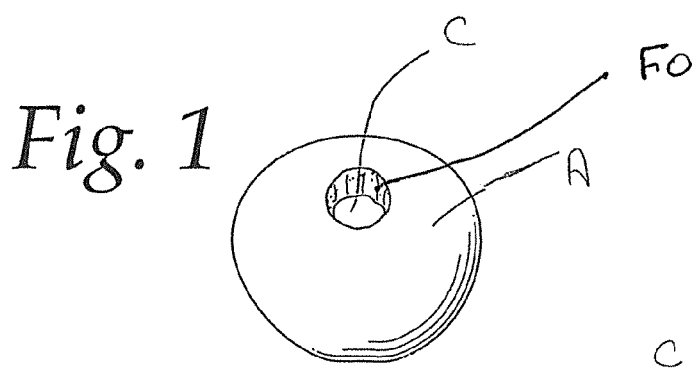
FIG. 1 is a bottom view of an apple with a cavity formed therein according to the present invention.
Figure 2:
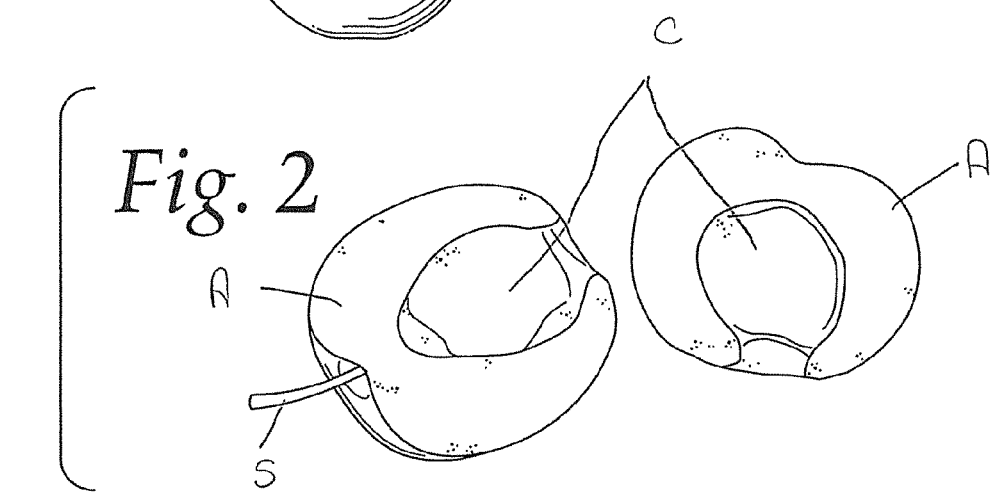
FIG. 2 shows the apple in FIG. 1 split vertically.
Figure 3:
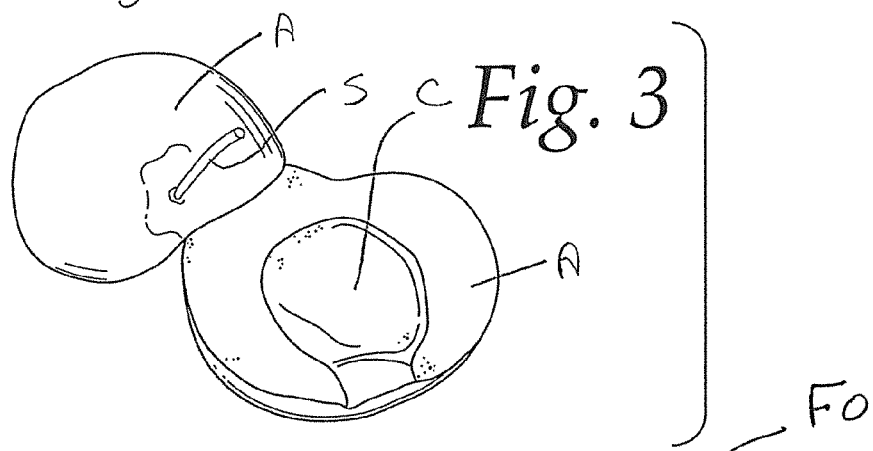
FIG. 3 is a view as in FIG. 2 with the parts viewed from a different perspective.
Figure 4:
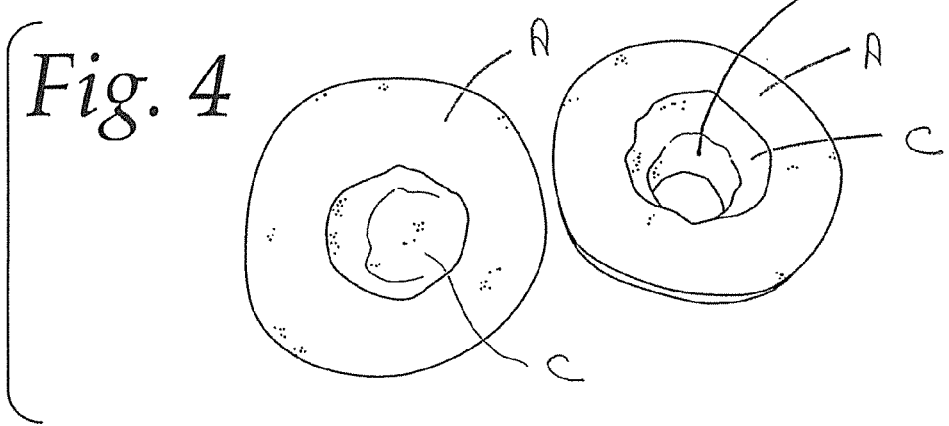
FIG. 4 is a view of the apple split horizontally.
Figure 5:
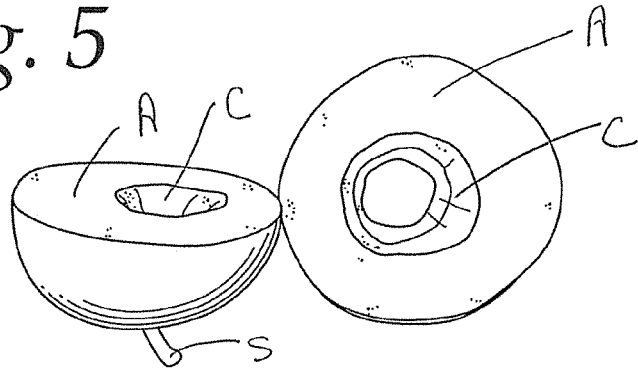
FIG. 5 is a view of the parts in FIG. 4 taken from a different perspective.
Figure 6:
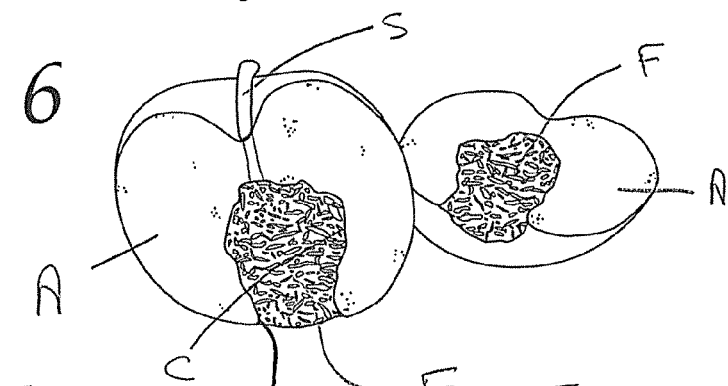
FIG. 6 shows the parts as in FIG. 2 with a filling in the cavity.
Figure 7:
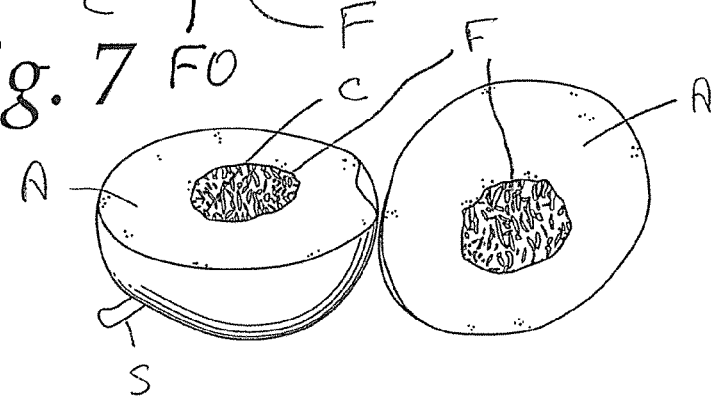
FIG. 7 is a view as in FIG. 4 with a filling in the cavity.
Figure 8:
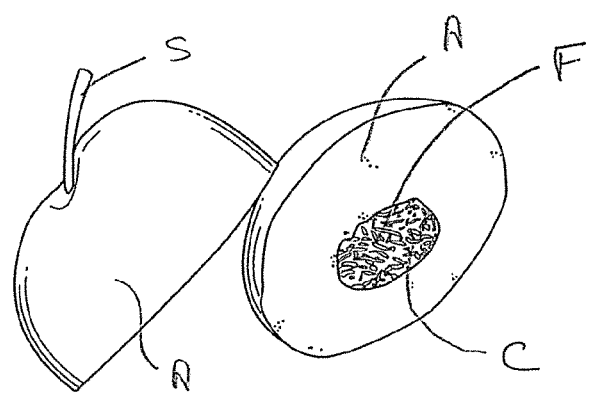
FIG. 8 is a view of the apple parts as in FIG. 7 but from a different perspective.

The core is removed preferably from the bottom of the apple up, but in a manner so as to leave the apple's own stem S intact. Typically, this will involve forming the cavity so that it terminates about ¾ of an inch from the top of the apple and extends fully through the bottom of the apple to define a bottom filling opening FO through which the edible filling is directed into the cavity. The bottom filling opening FO is formed by cutting and removing a substantial area of an exposed outer surface of the apple at the bottom to where the core extends. The area is preferably approximately equal to the diameter of the core that is removed. The introduced filling fills and blocks the filling opening FO. As seen in FIG. 6, the filling F remains exposed at the filling opening FO.

It has been found that cavity formation in this manner allows the stem to remain with sufficient integrity that it can be used to lift and reorient the apple as it is consumed. While the external surface of the cavity could additionally be coated, it is possible to leave the apple without any external application on the natural skin thereof. With this construction, the apple appears to be unmodified at its top region.

Additionally, by not applying any coating on the apple, a person eating the apple can controllably reposition the same with one hand holding the stem and the other balancing the apple at a spaced location with the other hand applied against the external skin.

The core can be removed so that the cavity is closely conformed in shape to the non-desirable core components—the fibrous/woody carpels and seeds. The cavity could be made larger and in different shapes to accommodate more filling material.

With this design, a person eating the apple can consume virtually the entire remaining apple and filling without contending with the core, leaving only the stem, which can be readily disposed of.

Thus, the apple potentially has the appearance of an unaltered apple, while being significantly more appealing by reason of the internal filling. At the same time, one does not have to contend with inserting and ultimately disposing of a stick through which the apple can be handled as it is moved prior to, and during, consumption.

The Figures show the apple A halved in different manners with and without the filling F. The apple A can be displayed uncut, except to form the cavity C, in an upright orientation with the filling F in place and is essentially indistinguishable from a normal edible apple.

The foregoing disclosure of specific embodiments is intended to be illustrative of the broad concepts comprehended by the invention.

The invention claimed is:

1. In combination;
an apple with an exposed outer surface, a top and bottom and having a core made up of fibrous/woody carpels and seeds removed to produce a cavity extending from the bottom of the apple upwardly but not fully to the top of the apple so as to leave a top stem intact; and
an edible filling added to the apple within the cavity,
the cavity extending fully through the bottom of the apple to define a filling opening with a diameter at the bottom of the apple at which a substantial area of the exposed outer surface is cut out and removed and through which the edible filling can be directed into the cavity which has a diameter substantially the same size as the diameter of the filling opening, and which is substantially filled and blocked by the edible filling, the edible filling exposed at the bottom of the apple in the filling opening.

2. The combination according to claim 1 wherein the area of the exposed outer surface that is cut and removed has a diameter approximately equal to a diameter of the core.

\* \* \* \* \*